BALDWIN & ABORN.
Grain-Drill.
No. 44,502.  Patented Oct. 4, 1864.
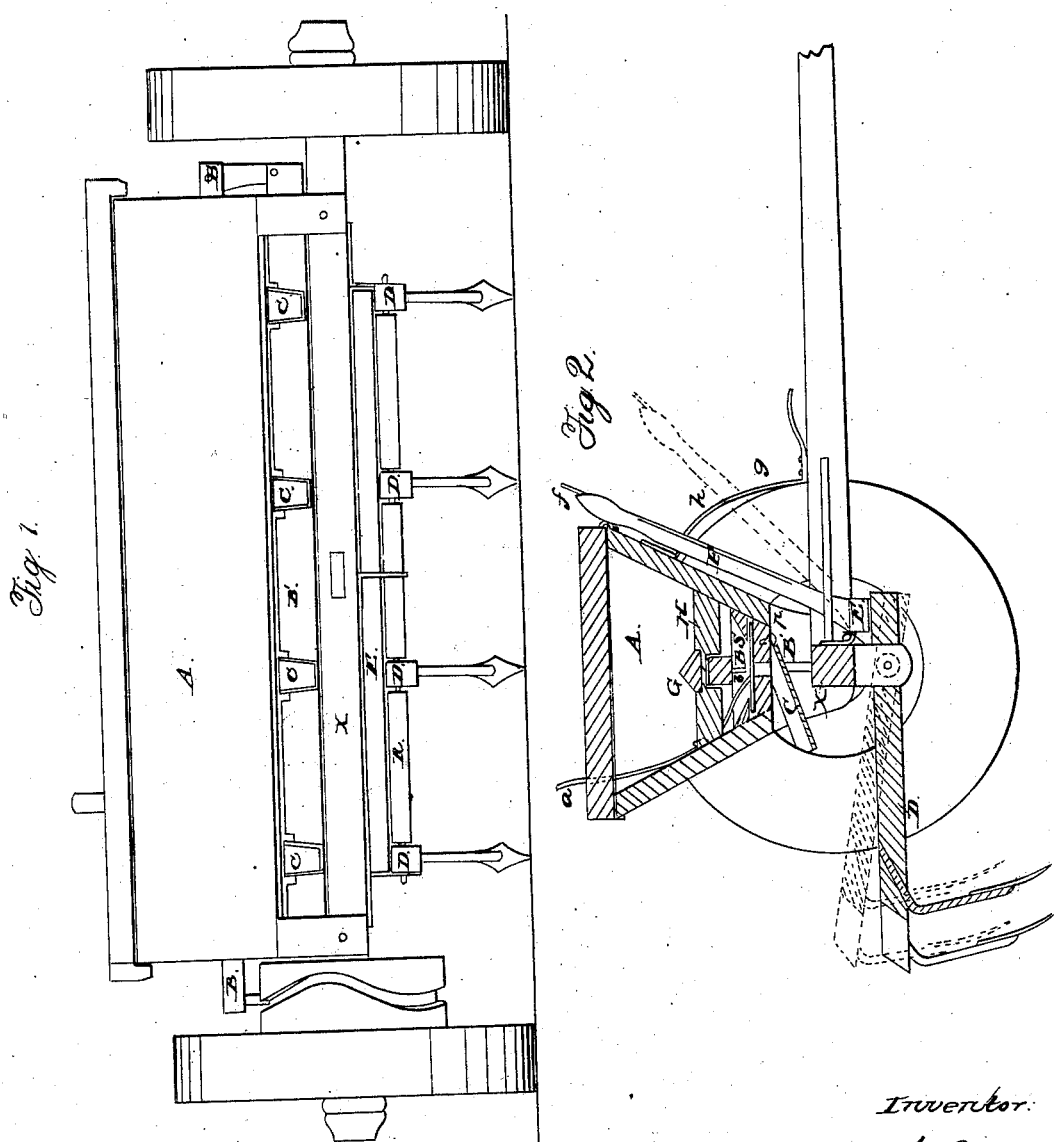
Witnesses:  Inventor:

UNITED STATES PATENT OFFICE.

C. A. BALDWIN AND C. ABORN, OF INDEPENDENCE, IOWA.

IMPROVED SEEDING-MACHINE.

Specification forming part of Letters Patent No. 44,502, dated October 4, 1864.

*To all whom it may concern:*

Be it known that we, C. A. BALDWIN and C. ABORN, of Independence, Buchanan county, in the State of Iowa, have invented certain Improvements in Machines for Sowing Grain; and we do hereby declare that the following is a full, clear, and exact description of the same, reference being had to the accompanying drawings, making a part of this specification, in which—

Figure 1 is a representation of the rear side of the machine. Fig. 2 is a representation of a cross-section of the machine in the line $x\,x$ of Fig. 1.

Similar letters of reference indicate corresponding parts in the several figures.

The nature of our improvements consist, first, in the mode of attaching and vibrating the discharge-spouts, so as to secure an even broadcast distribution of the grain on the ground; second, in the manner of constructing and arranging the rack and bar on the inside of the hopper, so as to relieve the agitator from the weight of the grain; third, in the manner of attaching the cultivators and in the construction of the device for raising or lowering them.

To enable those skilled in the art to fully understand and construct our invention, we will proceed to describe it.

A represents the hopper of the machine.

B is the agitator, which receives a vibratory motion from its attachment to the driving-wheel.

B' is a bar immediately under the hopper, which is attached rigidly to the outer end of B and moves in unison therewith. B' has recesses cut in its top edge, in which rests the spouts C.

C are the discharge-spouts, which are pivoted or hinged by their front end to the bottom of the hopper, as shown at $p$, Fig. 2, and rest loosely in the recesses cut in the top of B'.

D are cultivators hinged near their front ends on the bar or rod R, which hangs in stirrups from the under side of the axle X of the machine.

E is a bar hinged by its upper rear corner to the lower front corner of the axle X, and rests upon the front ends of the cultivators, which project beyond their attachment to R.

F is a hand-lever framed into E near its center.

G is a triangular bar, extending from one end of the hopper to the other upon the inside and immediately over the agitator B. This bar rests with the apex of the angle, upward upon the supports H, to which it may be fastened permanently. These supports may be placed one at each end; or, if necessary, intermediate ones may be inserted, the whole being free from the hopper, so that it can be removed at pleasure.

H are the supports of bar G. They have their ends beveled, so as to rest against and be supported by the sides of the hopper, and have cut in the middle of their under sides recesses, through which the agitator vibrates.

The operation is as follows: The hopper A being filled with grain, the weight that would otherwise rest upon the top of B rests on G. The machine is put in motion. The agitator B is vibrated by its attachment in the groove of the inner part of the driving-wheel. The agitator by its motion feeds the grain, by the assistance of the teeth $b$ on its under side, through the orifices $c$ into the discharge-spouts C. B', being rigidly attached at the outer end to B, moves in unison therewith and carries the spouts C, which rest in its top, back and forth with it, as shown in red lines in Fig. 1, thus giving to the spouts C a vibratory motion, which secures a proper distribution of the seed sown. The flow of seed to the spouts is regulated by means of a thin metal or wooden register, $s$, extending the length of the machine, with openings through it corresponding with openings $c$. By means of lever $a$ register $s$ is moved so as to arrange the size of opening required. The grain from spouts C falls in front of the cultivator-teeth, and is by them covered.

In case of obstructions, or in moving the machine from place to place, when it is required to raise the cultivators clear from the ground, the operation is as follows: Press lever F forward and downward, as represented in red lines in Fig. 2, which depresses the front lower angle of bar E, carrying down with it the front ends of the cultivators and raising the hind ends any required height. Lever F can be held in any required position by means of spring $f$ engaging in notches $g$ on segment $h$.

What we claim as our improvements, and desire to secure by Letters Patent, is—

1. The manner of constructing, attaching, and operating the discharge-spouts C, when constructed and operated as described.

2. The bar G and its supports H, when constructed and placed as and for the purpose described.

3. The manner of constructing and attaching the cultivators D and the mode of raising and lowering them by means of E and F, as described, in combination with said machine.

4. The combination and arrangement of the said seeding-machine in all its several parts, when constructed and arranged and operating in the manner and for the purposes set forth.

C. A. BALDWIN.
C. ABORN.

Witnesses:
JAMES M. WEART,
T. H. TYSON.